United States Patent
Hsieh et al.

(10) Patent No.: US 6,798,860 B1
(45) Date of Patent: Sep. 28, 2004

(54) METHODS AND APPARATUS FOR DECONVOLVING IMAGING DATA

(75) Inventors: Jiang Hsieh, Brookfield, WI (US); Idris A. Elbakri, Ann Arbor, MI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/572,216

(22) Filed: May 17, 2000

(51) Int. Cl.$^7$ .......................... A61B 6/00; G01N 23/00; G21K 1/12; H05G 1/60
(52) U.S. Cl. .......................... 378/4; 378/901; 382/131; 382/279
(58) Field of Search .............................. 382/131, 132, 382/123, 279; 378/4, 15, 901

(56) References Cited

U.S. PATENT DOCUMENTS

| | | | |
|---|---|---|---|
| 4,635,197 A | * 1/1987 | Vinegar et al. | 378/4 |
| 5,247,175 A | * 9/1993 | Schoen et al. | 250/281 |
| 5,491,735 A | 2/1996 | Hsieh | |
| 5,594,767 A | 1/1997 | Hsieh | |
| 5,732,118 A | 3/1998 | Hsieh | |
| 5,757,951 A | * 5/1998 | Tuy | 382/131 |
| 5,818,896 A | 10/1998 | Hsieh | |
| 5,864,598 A | 1/1999 | Hsieh et al. | |
| 5,907,593 A | 5/1999 | Hsieh et al. | |
| 6,023,494 A | 2/2000 | Senzig et al. | |
| 6,115,447 A | 9/2000 | Hsieh | |
| 6,115,487 A | 9/2000 | Toth et al. | |
| 6,134,292 A | 10/2000 | Hsieh | |
| 6,215,841 B1 | 4/2001 | Hsieh | |
| 6,215,846 B1 | * 4/2001 | Mazess et al. | 378/62 |
| 6,226,350 B1 | 5/2001 | Hsieh | |
| 6,233,308 B1 | 5/2001 | Hsieh | |
| 6,236,706 B1 | 5/2001 | Hsieh | |
| 6,252,926 B1 | * 6/2001 | Flohr et al. | 378/15 |
| 6,256,368 B1 | 7/2001 | Hsieh et al. | |
| 6,342,699 B1 | * 1/2002 | Jeanguillaume | 250/363.1 |
| 6,366,637 B1 | * 4/2002 | Hsieh et al. | 378/19 |

* cited by examiner

*Primary Examiner*—Amelia M. Au
*Assistant Examiner*—Charles Kim
(74) *Attorney, Agent, or Firm*—Carl V. Horton, Esq.; Armstrong Teasdale LLP

(57) ABSTRACT

A method for deconvolving imaging data obtained in slices using an imaging system. The method includes steps of selecting a target slice sensitivity profile and determining a deconvolution kernel using the target slice sensitivity profile. This method allows an imaging system user to use singular value decomposition to achieve a desired slice sensitivity profile through imaging data deconvolution. Thus sub-millimeter slice thickness and improved image resolution are achieved without hardware modifications to existing imaging systems.

20 Claims, 2 Drawing Sheets

METHODS AND APPARATUS FOR DECONVOLVING IMAGING DATA

BACKGROUND OF THE INVENTION

This invention relates generally to tomographic imaging, and more particularly to methods and apparatus for deconvolving tomographic imaging data.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two-dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

In known CT systems the x-ray beam is projected from the x-ray source through a pre-patient collimator that defines the x-ray beam profile in the patient axis, or z-axis. The collimator typically includes x-ray-absorbing material with an aperture therein for restricting the x-ray beam.

CT imaging systems typically provide image resolution within limitations imposed by such factors as collimator aperture size and slice thickness. A minimum slice thickness for at least one CT system is 1.25 millimeters, as determined primarily by detector element pitch size. In order to improve image resolution, it is desirable to reduce slice thickness to less than 1 millimeter, and to achieve such reduction with minimal impact on imaging system hardware.

It is known to reduce slice thickness by deconvolving tomographic imaging data, for example, projection data or image data, to reduce the full-width-at-half-maximum (FWHM) interval of a reconstructed slice profile. It is also known that singular value decomposition (SVD) is a matrix transform technique and can be used to arrive at a "pseudo-inverse" to perform data deconvolution. SVD is described as follows. Let P, an n-by-1 matrix, represent a CT system slice sensitivity profile (SSP). Matrix A represents an n-by-n circular shift matrix and is derived from P using a relationship written as:

$$a_{i,j} = p_k, k = mod\left(i + j + \frac{n}{2}, n\right)$$

where $\alpha_{i,j}$ are elements of A and $P_k$ are elements of P. It is well known that, by SVD, matrix A is transformed to a product of an n-by-n column orthogonal matrix U, an n-by-n diagonal matrix W, and a transpose of an n-by-n orthogonal matrix V, i.e. using a relationship written as:

$$A = UWV^T$$

Here an n-by-n matrix is used to represent A. In general, A could be an n-by-m matrix, U an n-by-l matrix, V an m-by-l matrix, and W an l-by-l matrix. For ease of illustration, an n-by-n matrix is used throughout this application.

An n-by-n deconvolution kernel matrix D is obtained using a relationship written as:

$$D = VW'U^T$$

where W' is determined from W using a relationship written as:

$$W'_{ii} = \begin{cases} \dfrac{1}{W_{ii} + \alpha}, & W_{ii} > t \\ 0, & \text{otherwise} \end{cases}$$

where $\alpha$ is a regularization parameter and t is a threshold. A deconvolution kernel is obtained from matrix D. The kernel is the center column of D and thus has dimension (n, 1). The kernel is applied in imaging data deconvolution to reduce the FWHM of the imaging system SSP. Note that here only the central column is used for computational efficiency. In general, the entire matrix could be used for deconvolution.

The above-described approach, however, incorporates an assumption that the SSP, a point spread function, is to be reconstructed as a delta (impulse) function. Inflexibility of matrix inversion leaves little if any opportunity to correct for this assumption, which in many imaging applications leads to less than optimal imaging. It would be desirable to improve SVD results for use in imaging data deconvolution and thus improve image quality. It also would be desirable to make SVD more generally applicable to imaging data deconvolution.

BRIEF SUMMARY OF THE INVENTION

There is therefore provided, in one embodiment, a method for deconvolving imaging data obtained in slices using an imaging system, the method including the steps of selecting a target slice sensitivity profile and determining a deconvolution kernel using the target slice sensitivity profile. The above-described method allows an imaging system user to use singular value decomposition to achieve a desired slice sensitivity profile through imaging data deconvolution. Thus sub-millimeter slice thickness and improved image resolution are achieved without having to modify hardware in existing imaging systems.

DETAILED DESCRIPTION OF THE INVENTION

Figure 1:
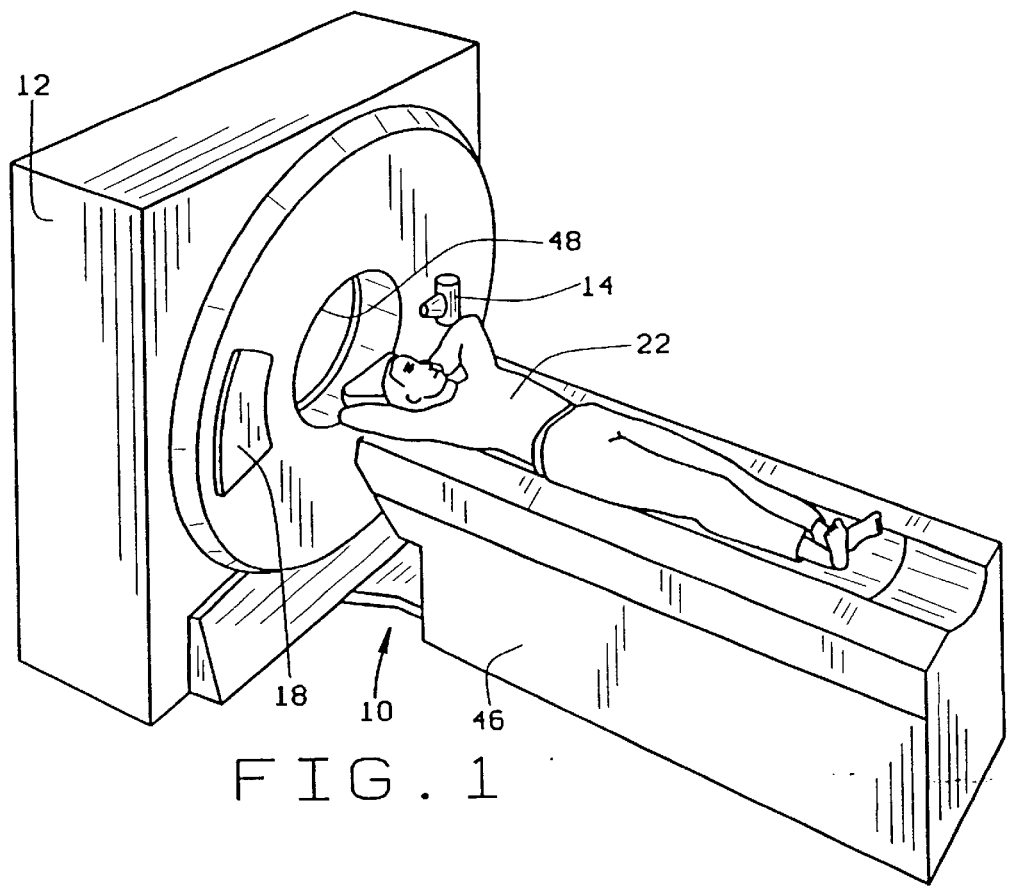
FIG. 1 is a pictorial view of a CT imaging system.
Figure 2:
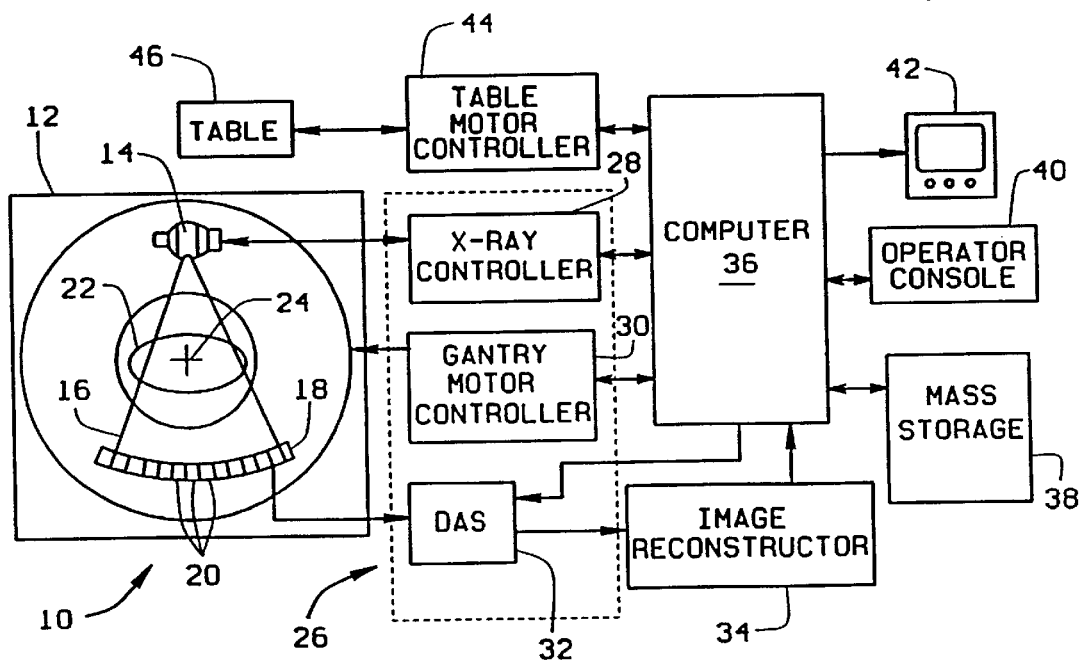
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

In accordance with one embodiment of the present invention, imaging data, e.g. projection data, is obtained in slices from a scan of object 22 by imaging system 10. An embodiment of a method for deconvolving imaging data of object 22 includes the step of selecting a desired or target slice sensitivity profile, for example, a Gaussian function having a desired full-width-at-half-maximum (FWHM) interval. A deconvolution kernel then is determined using the target slice sensitivity profile.

Figure 3:
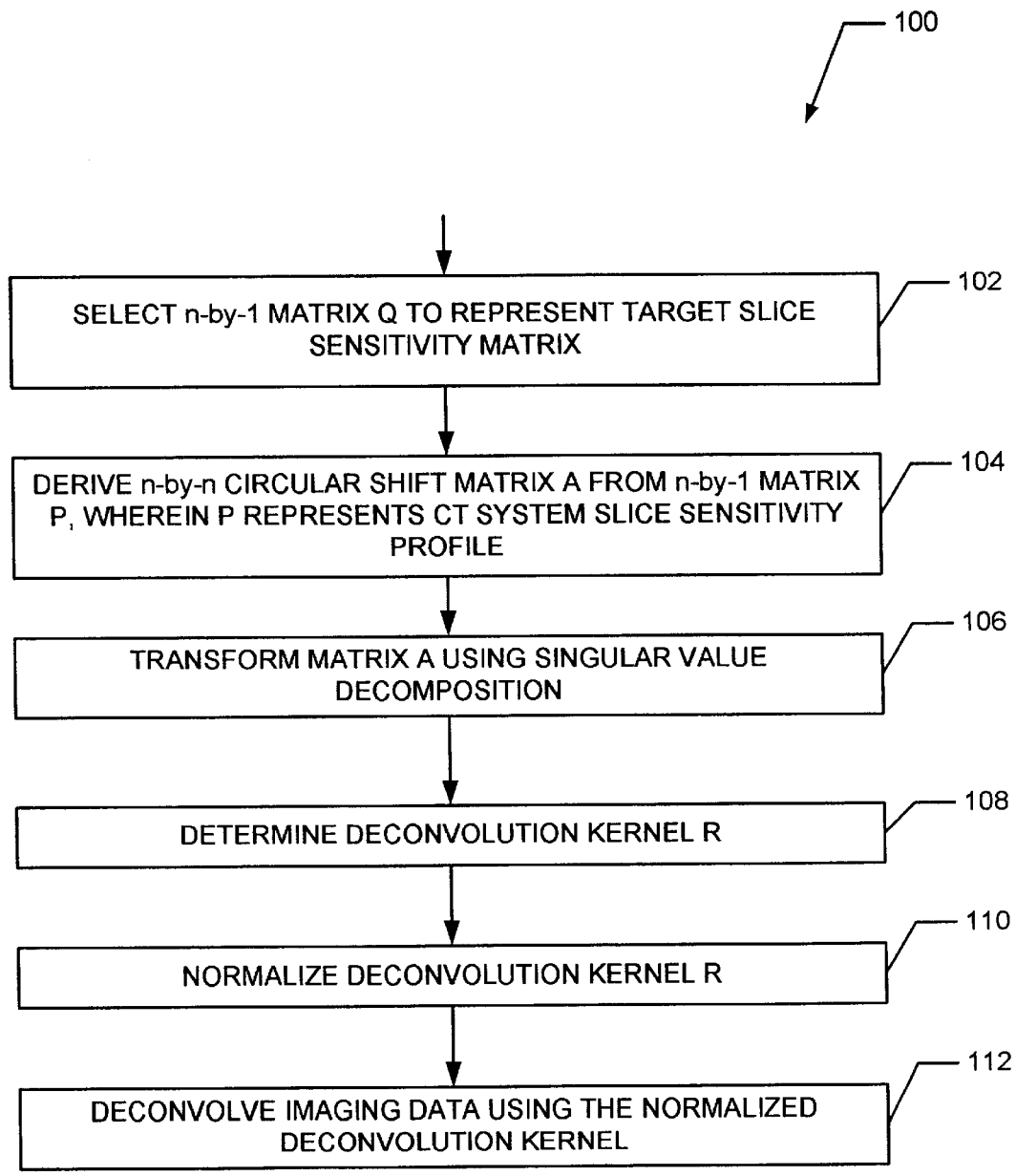
FIG. 3 is a flow chart representative of various configurations of the present invention.

More particularly and referring to flow chart 100 of FIG. 3, an n-by-1 matrix Q is selected at 102 to represent the target slice sensitivity profile. Next let P, an n-by-1 matrix, represent CT system 10 slice sensitivity profile (SSP). Matrix A represents an n-by-n circular shift matrix and is derived from P at 104 using a relationship written as:

$$a_{i,j} = p_k, k = mod\left(i + j + \frac{n}{2}, n\right)$$

where $\alpha_{i,j}$ are elements of A and $P_k$ are elements of P. It is known that, by singular value decomposition (SVD), matrix A is transformed at 106 to a product of an n-by-n column orthogonal matrix U, an n-by-n diagonal matrix W, and a transpose of an n-by-n orthogonal matrix V, i.e. using a relationship written as:

$$A = UWV^T$$

In one embodiment a deconvolution kernel R is determined at 108 using a relationship written as:

$$R = VW'U^TQ$$

where Q is the n-by-1 matrix representing the target slice sensitivity profile and U, V and W' are the matrices related to matrix A through singular value decomposition as above described. Kernel R is an n-by-1 matrix. In another embodiment, in order to preserve CT number accuracy, R is normalized at 110 to obtain, for example, a matrix $R_N$ using a relationship written as:

$$\sum_i R_i = 1$$

where $R_i$ are elements of R. The imaging data then is deconvolved at 112 using the the deconvolution kernel, e.g., the normalized deconvolution kernel $R_N$.

The above-described calculations are, in one embodiment, implemented in computer 36. In another embodiment, another computer (not shown) is used to perform these calculations. The above-described method is implemented to deconvolve projection data and, in another embodiment, is used to deconvolve image data, e.g. filtered and backprojected data. Furthermore, the present invention can be practiced with other imaging systems besides CT imaging systems.

Use of the above-described method improves performance and flexibility of single value decomposition when used with imaging data deconvolution. The above-described method allows the imaging system user to achieve a desired reconstructed slice sensitivity profile. Thus slice thickness is reduced to below one millimeter and image resolution is improved without increased hardware costs.

Although particular embodiments of the invention have been described and illustrated in detail, it is to be clearly understood that the same is intended by way of illustration and example only and is not to be taken by way of limitation. In addition, the CT system described herein is a "third generation" system in which both the x-ray source and detector rotate with the gantry. Many other CT systems including multi-slice systems and "fourth generation" systems wherein the detector is a full-ring stationary detector and only the x-ray source rotates with the gantry, may be used.

While the invention has been described in terms of various specific embodiments, those skilled in the art will recognize that the invention can be practiced with modification within the spirit and scope of the claims.

What is claimed is:

1. A method for deconvolving imaging data obtained in slices using an imaging system, said method comprising the steps of:
    selecting a desired target slice sensitivity profile; and
    determining a deconvolution kernel using the desired target slice sensitivity profile.

2. A method in accordance with claim 1 wherein said step of selecting a desired target slice sensitivity profile comprises the step of selecting a Gaussian function having a desired full-width-at-half-maximum interval.

3. A method in accordance with claim 1 wherein said step of determining a deconvolution kernel using the desired target slice sensitivity profile comprises the step of determining a deconvolution kernel using a system slice sensitivity profile and singular value decomposition.

4. A method for deconvolving imaging data obtained in slices using an imaging system, said method comprising the steps of:
    selecting a target slice sensitivity profile; and determining a deconvolution kernel using the target slice sensitivity profile, wherein said determining a deconvolution kernel further comprises the step of determining a deconvolution kernel R using a relationship written as:

$$R = VW'U^T Q$$

where U, V and W are matrices determined from a slice sensitivity profile using singular value decomposition, V is an n-by-n orthogonal matrix, W' is an n-by-n diagonal matrix, U is an n-by-n column orthogonal matrix, and Q is an n-by-1 matrix representing the target slice sensitivity profile.

5. A method in accordance with claim 4 wherein U, V and W' are related using a relationship written as:

$$A = UWV^T$$

where A is a circular shift matrix derived from a slice sensitivity profile and $$W'_{ii} = \begin{cases} \frac{1}{W_{ii} + \alpha}, & W_{ii} > t \\ 0, & \text{otherwise} \end{cases}.$$

6. A method in accordance with claim 5 further comprising the step of determining A using a relationship written as:

$$a_{i,j} = p_k, k = mod\left(i + j + \frac{n}{2}, n\right)$$

where $\alpha_{i,j}$ are elements of A and $P_k$ are elements of a matrix representing a system slice sensitivity profile.

7. A method in accordance with claim 4 wherein R is an n-by-1 matrix, said method further comprising the step of normalizing R to obtain a normalized matrix $R_N$ using a relationship written as:

$$\sum_i R_i = 1$$

where $R_i$ are elements of R.

8. A method in accordance with claim 7 further comprising the step of deconvolving the imaging data using the normalized matrix $R_N$ as a deconvolution kernel.

9. An imaging system configured to:
obtain slices of imaging data of an object;
determine a deconvolution kernel using a desired, selected target slice sensitivity profile; and
deconvolve the imaging data using the deconvolution kernel.

10. A system in accordance with claim 9 wherein said system being configured to determine a deconvolution kernel using a desired target slice sensitivity profile comprises being configured to use as a desired target slice sensitivity profile a Gaussian function having a desired full-width-at-half-maximum interval.

11. A system in accordance with claim 9 wherein said system being configured to determine a deconvolution kernel using a desired target slice sensitivity profile comprises being configured to determine a deconvolution kernel using a system slice sensitivity profile and singular value decomposition.

12. An imaging system configured to:
obtain slices of imaging data of an object;
determine a deconvolution kernel using a target slice sensitivity profile; and
deconvolve the imaging data using the deconvolution kernel, wherein to deconvolve the imaging data, said imaging system is configured to determine a deconvolution kernel R using a relationship written as:

$$R = VW'U^T Q$$

where U, V and W are matrices determined from a slice sensitivity profile using singular value decomposition, V is an n-by-n orthogonal matrix, W' is an n-by-n diagonal matrix, U is an n-by-n column orthogonal matrix, and Q is an n-by-1 matrix representing the target slice sensitivity profile.

13. A system in accordance with claim 12 wherein U, V and W' are related using a relationship written as:

$$A = UWV^T$$

where A is a circular shift matrix derived from a slice sensitivity profile and $$W'_{ii} = \begin{cases} \frac{1}{W_{ii} + \alpha}, & W_{ii} > t \\ 0, & \text{otherwise} \end{cases}.$$

14. A system in accordance with claim 13 further configured to determine A using a relationship written as:

$$a_{i,j} = p_k, k = mod\left(i + j + \frac{n}{2}, n\right)$$

where $a_{i,j}$ are elements of A and $p_k$ are elements of a matrix representing a system slice sensitivity profile.

15. A system in accordance with claim 12 wherein R is an n-by-1 matrix, said system being further configured to normalize R to obtain a normalized matrix $R_N$ using a relationship written as:

$$\sum_i R_i = 1$$

where $R_i$ are elements of R.

16. A system in accordance with claim 15 further configured to deconvolve the imaging data using the normalized matrix $R_N$ as a deconvolution kernel.

17. A method for generating imaging data of an object scanned by an imaging system configured to obtain imaging data in slices, said method comprising the steps of:
obtaining slices of imaging data;
determining a circular shift matrix A using the imaging system slice sensitivity profile;
using singular value decomposition to transform the circular shift matrix A to a matrix product $UWV^T$ of a column orthogonal matrix U, a diagonal matrix W, and a transpose of an orthogonal matrix V;
determining a matrix product $VW'^{UT}$ using a transpose of the column orthogonal matrix U,
using the matrix product $VW'U^T$ and a target slice sensitivity profile to determine a deconvolution kernel; and
deconvolving the imaging data using the deconvolution kernel.

18. A method in accordance with claim 17 wherein the step of using the matrix product $VW'U^T$ and a target slice sensitivity profile to determine a deconvolution kernel comprises determining a deconvolution kernel using a relationship written as:

$$R = VW'U^T Q$$

where Q is the target slice sensitivity profile.

19. A method in accordance with claim 17 wherein the step of deconvolving the imaging data using the deconvolution kernel comprises deconvolving projection data.

20. A method in accordance with claim 17 wherein the step of deconvolving the imaging data using the deconvolution kernel comprises deconvolving image data.

* * * * *

UNITED STATES PATENT AND TRADEMARK OFFICE
CERTIFICATE OF CORRECTION

PATENT NO. : 6,798,860 B1
DATED : September 28, 2004
INVENTOR(S) : Hsieh et al.

It is certified that error appears in the above-identified patent and that said Letters Patent is hereby corrected as shown below:

Column 5,
Line 43, after "where" delete "$a_{i,j}$" and insert -- $a_{i,j}$ --.

Column 6,
Line 59, after "a matrix product" delete "$VW'^{UT}$" and insert -- $VW'U^T$ --.

Signed and Sealed this

Twenty-seventh Day of December, 2005

JON W. DUDAS
*Director of the United States Patent and Trademark Office*